Figure 1:
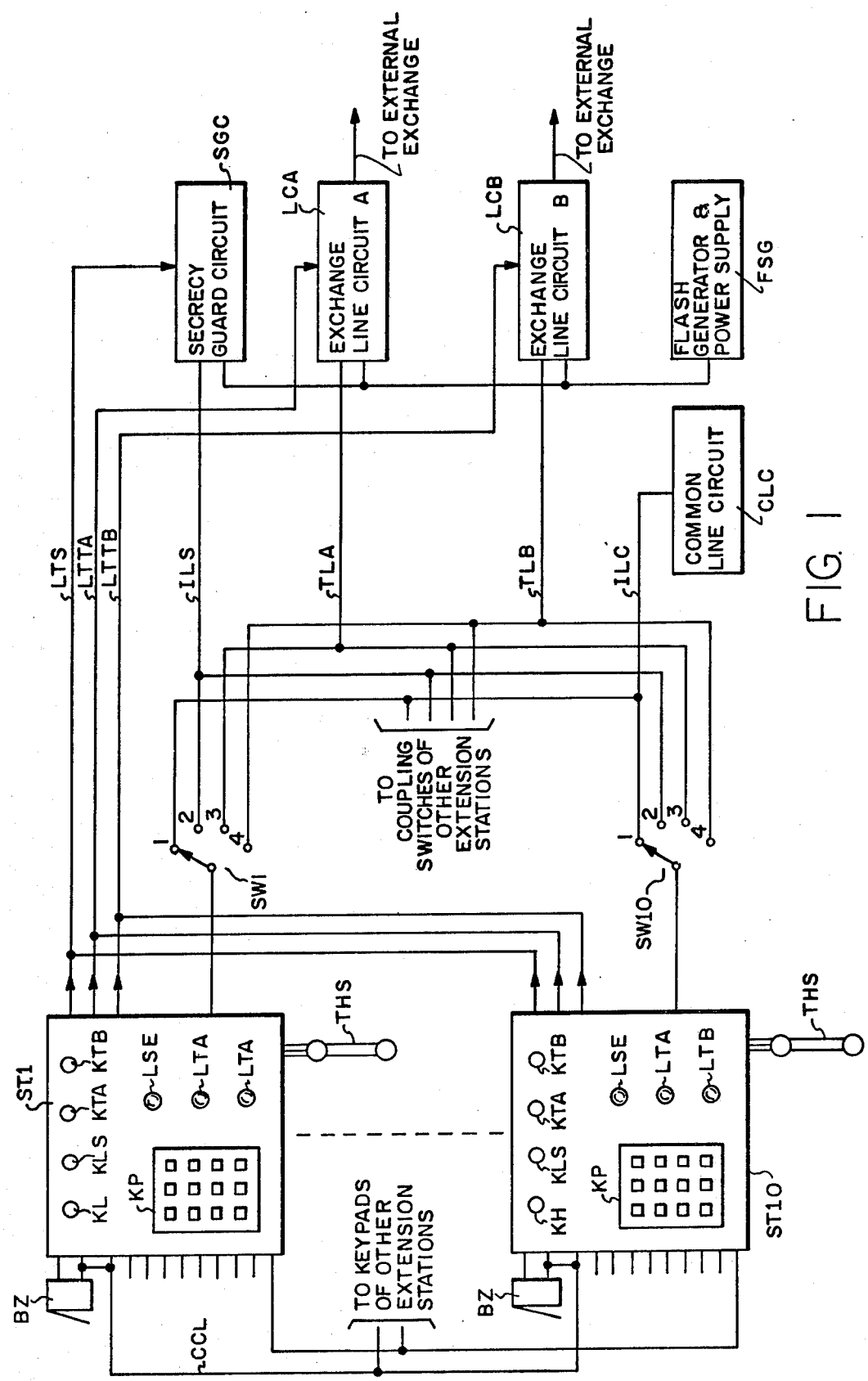

United States Patent [19]
Warman

[11] 3,931,478
[45] Jan. 6, 1976

[54] TELEPHONE INTERCOMMUNICATION SYSTEM PROVIDED WITH A COMMON COMMUNICATION LINE TO WHICH ACCESS IS GUARDED

[75] Inventor: Bloomfield James Warman, Como, Italy

[73] Assignee: GTE International Incorporated, Stamford, Conn.

[22] Filed: Sept. 19, 1974

[21] Appl. No.: 507,323

[30] Foreign Application Priority Data
Oct. 26, 1973 United Kingdom............... 50059/73

[52] U.S. Cl..................................... 179/37; 179/99
[51] Int. Cl.[2].......................................... H04M 1/00
[58] Field of Search... 179/1 CN, 1 H, 18 AD, 18 BC, 179/37, 38, 39, 40, 84 B, 99, 30, 17 B, 19, 27 D

[56] References Cited
UNITED STATES PATENTS

| 3,576,397 | 4/1971 | Pell et al. | 179/37 |
| 3,843,845 | 10/1974 | Ridley | 179/99 |
| 3,860,763 | 1/1975 | Sudoh et al. | 179/99 |

*Primary Examiner*—Thomas A. Robinson
*Attorney, Agent, or Firm*—Robert J. Black

[57] ABSTRACT

A private telephone intercommunication system including facilities for connecting the system to a telephone central office. Means are included and restrict internal calls to only two stations to insure privacy.

4 Claims, 3 Drawing Figures

TELEPHONE INTERCOMMUNICATION SYSTEM PROVIDED WITH A COMMON COMMUNICATION LINE TO WHICH ACCESS IS GUARDED

This invention concerns improvements in telephone intercommunication systems, and relates in particular to a system including a common communication line accessible to all of a number of telephone stations, means being provided for guarding access to said channel so that a confidential conversation may take place between two or more of the telephone stations.

In patent application, Ser. No. 507,322, filed concurrently herewith it is proposed to provide a novel telephone intercommunication system including a common communication line accessible to all of a number of telephone stations. In such a system, when any telephone station goes off-hook it becomes connected to the common line, and thus any station going off-hook at any time may listen in to a conversation already being carried on between two or more previously connected stations. In circumstances where it is required that a conversation be confidential to two or more of the telephone stations this constitutes a disadvantage.

In accordance with the present invention there is provided a telephone intercommunication system including a plurality of telephone stations, a common communication circuit accessible to each of said telephone stations via line coupling switch means individual to each station, and a common control means for operating the line coupling switch means of each station to establish a connection to said common communication circuit in response to actuation of a corresponding manually operable control means of that station, the arrangement being such that when, following establishment of an initial connection to said common communication circuit via a line coupling switch means, the condition occurs that all of said manually operable control means are inoperative, the common control means is rendered ineffective to establish any further connection to the common communication circuit until the existing connections are released.

Thus in accordance with the arrangement of the invention, when one telephone station initially establishes a connection with the communication circuit by operation of the corresponding manual control means, the line coupling switch means of that station becomes connected to the communication circuit, and provided that the manually operable means is held actuated, any other telephone station may also establish a connection to the communication circuit by operating the corresponding manual control. When all telephone stations desiring to establish a confidential communication between themselves have actuated their manually operable control means, the control means are then released and until the communication circuit is broken the manual control means of the remaining telephone stations are rendered ineffective to establish any further connection to the communication circuit. The existing circuit thus remains confidential. The initial calling of telephone stations to be connected in this manner may be achieved in various ways. For example, a buzz calling signal arrangement may provide to an extension an indication that a communication is desired via the confidential circuit. Alternatively, the communication system may comprise a plurality of communication channels, there being one common non-guarded channel to which all stations going off-hook are initially connected, and one or more secret channels being provided to which the stations may transfer in the above manner upon mutual verbal agreement between them via the common open channel.

As will be appreciated from the above description, any number of telephone stations may connect into the confidential circuit while a call is initially being set up so that a so-called conference call may be established. However, in order to ensure that the number of telephone stations connected during initial setting up of the call is limited to two, in the case where two parties require a confidential conversation, means may be provided for indicating when more than two stations are connected into the communication circuit. Thus should two parties require a confidential conversation, the indication that there are more than two stations connected to the line will enable them to warn other parties to hang up and await the indication that this has occurred, before commencing their conversation.

Although the arrangement according to the present invention is primarily applicable to a telephone intercommunication system as described in Patent application, Ser. No. 507,322, that is a system providing both for one or more internal communication lines and for connection to one or more external exchange lines, it will be appreciated that the present invention is also applicable to a private intercommunication system including only internal communication lines and not intended for connection to an external exchange line. Moreover such a system may include any number of such guarded access communication lines, preferably in combination with an open communication line to which all telephone stations are initially connected in the idle condition.

According to one embodiment of the invention each line coupling switch means comprises a self-holding relay having relay contacts for establishing the connection to said common communication circuit, the corresponding manually operable means each comprising a push button switch arranged in a current path including the winding of said relay and extending to said common control circuit, and said common control circuit further including in said current path a relay having a relay contact arranged to modify a control signal applied via said current path, the arrangement being such that actuation of said push button switch first causes energization of the relay of the common control circuit and then, by means of said modified control signal, energization of the line coupling relay connected via a corresponding push button switch, release of all push button switches serving to deenergize the relay of the common control circuit, and means, responsive to closure of said communication circuit being provided for inhibiting reenergization of the common control relay.

The means for inhibiting energization of the common control relay may comprise a relay having a winding arranged in series in said common communication circuit and a normally closed relay contact in the current path to the winding of said common control relay, the latter relay having normally closed contacts in said common communication circuit.

In order to provide for the warning signal facility referred to above, when more than two telephone stations are connected to a confidential communication circuit, each of said self-holding relays have hold contacts connected in parallel to a common current path for energization of said relays, the arrangement being such that relay windings connected in parallel by way of said hold contacts form part of a potential divider circuit, and that when more than two of said relay windings are connected in parallel the potential at a tapping of said divider circuit causes a switching circuit connected thereto to respond and provide said warning signal.

Figure 2:
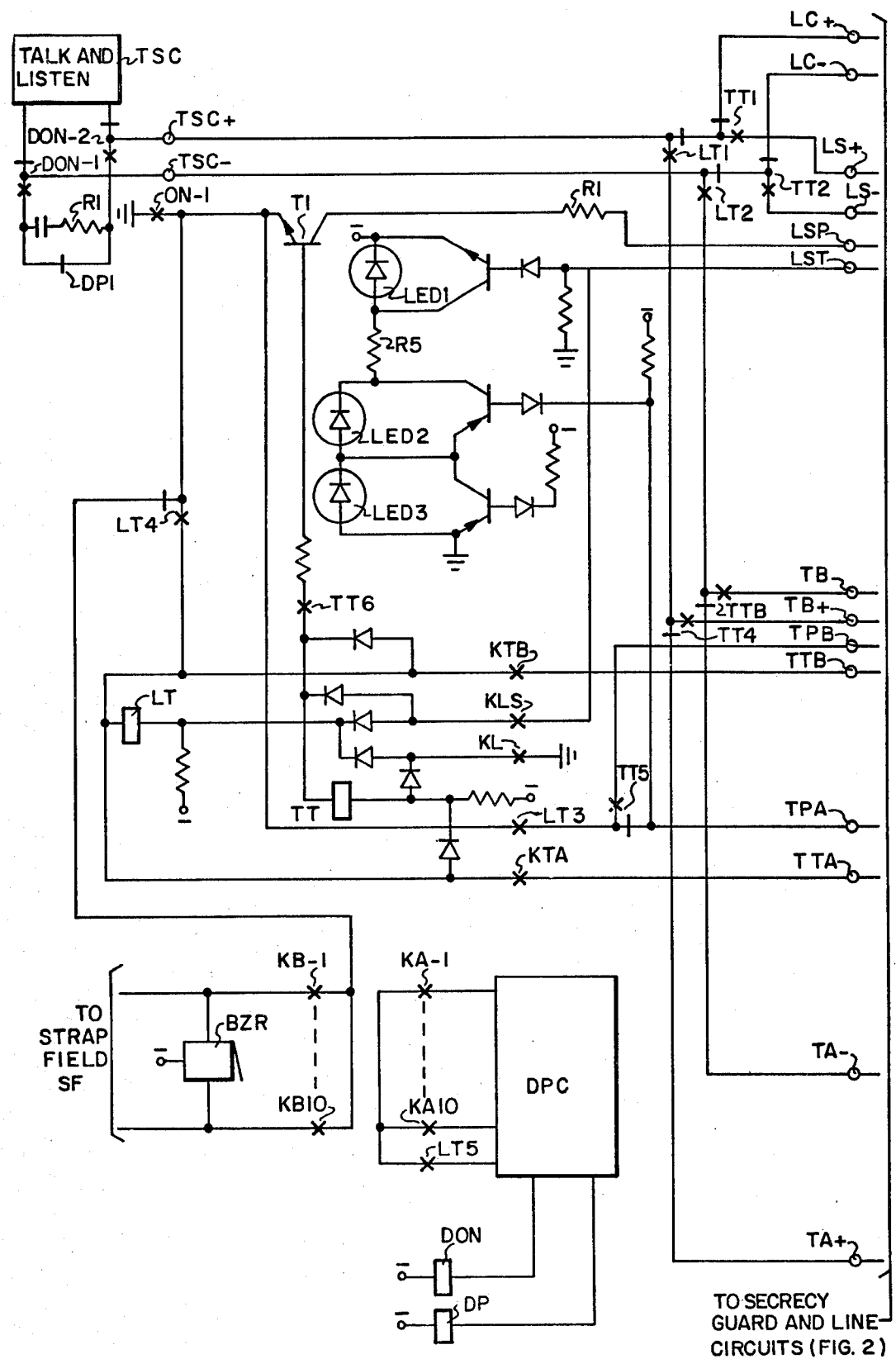
Figure 3:
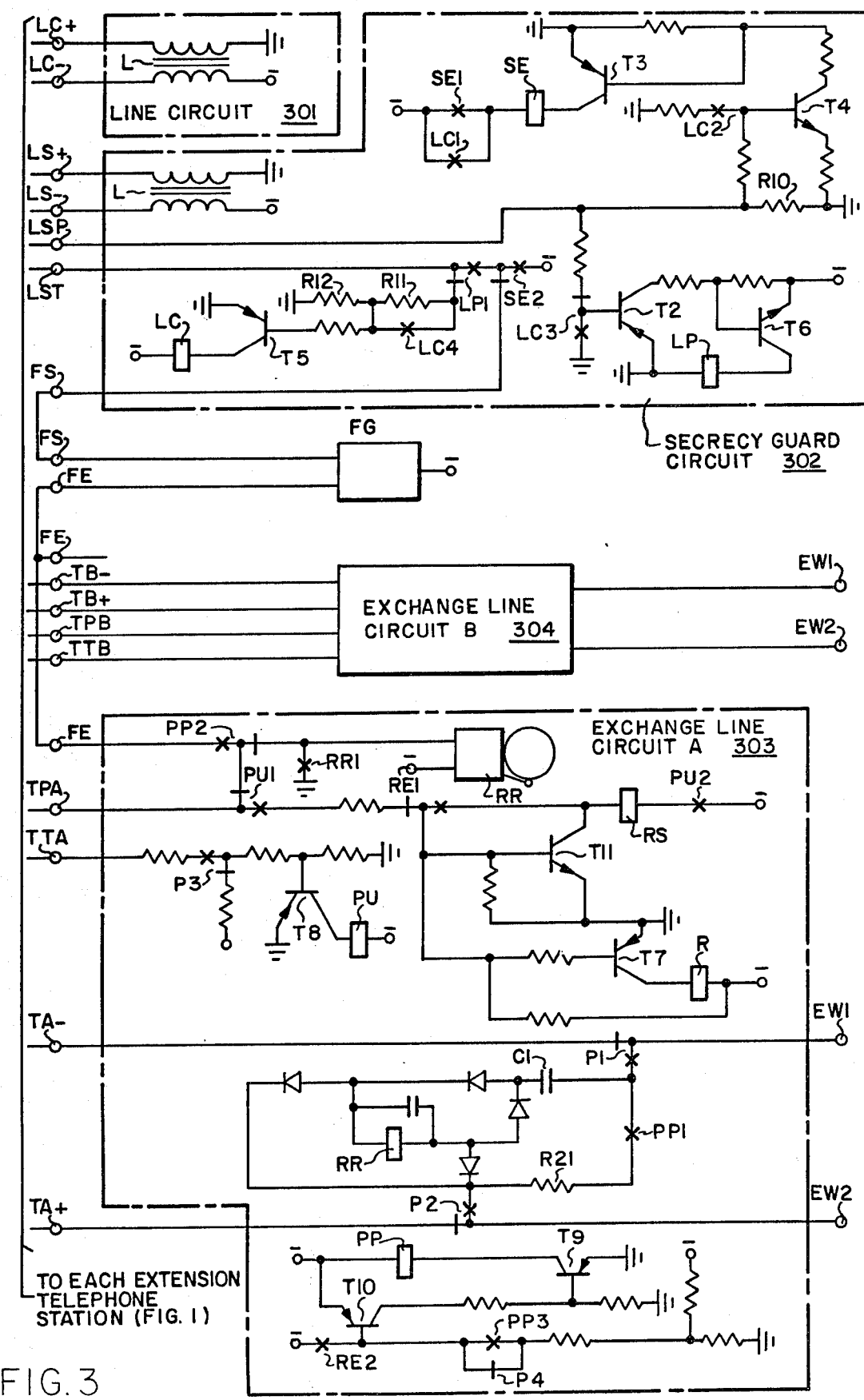

The invention is illustrated by way of example in the accompanying drawings, in which:

FIG. 1 is a schematic block circuit diagram of a communication system according to the invention, and FIGS. 2 and 3 together make up a more detailed circuit diagram of the arrangement shown in FIG. 1.

Referring to FIG. 1, the intercommunication system there shown is arranged to provide a number of telephone extension stations, with two telephone lines for internal calls between the stations and two telephone lines for external calls between extension stations of the system and stations served by another exchange, for example a main public exchange. It is to be appreciated, however, that intercommunication systems according to the invention may be provided to cater for more or less than ten extension stations and with more or less than two telephone lines for internal and/or external calls.

In the diagram of FIG. 1, only two extension stations, designated ST1 and ST10 are shown, and in use of the system, these would be allocated to respective locations within an office or factory building, or the like. Each extension telephone station comprises, in addition to the normal speech transmission circuit, a digital push button assembly, hereinafter termed a "keypad" KP, a group of four control push buttons designated KL, KLS, KTA and KTB, three visual indicators, which preferably take the form of light-emitting diodes, and designated LSE, LTA and LTB, a calling buzzer BZ, a telephone handset THS and telephone line coupling switch means, as indicated diagrammatically by the wiper and bank SW1 for station ST1 and by the wiper and bank SW10 for station ST10.

As also indicated in FIG. 1, the two telephone lines for internal calls, hereinafter termed "local" lines are indicated at ILC and ILS respectively, while the two telephone lines for external calls, hereinafter termed "trunk" lines are designated TLA and TLB respectively. The telephone lines are commoned over respective outlets of the telephone station coupling switches, which have four outlets, the first outlet 1 being a normal or rest outlet to which the local line ILC is connected, while the remaining outlets 2, 3 and 4 are connected, respectively to the local line ILS and to the trunk lines TLA and TLB. The extension stations thus have a parallel relationship to the telephone lines, so that the system is of the so-called "star" connected type, as distinct from the series connected type employing mechanically interlocked push buttons, in each telephone station, with change over contacts connected in a serial chain formation to provide the communication channel selecting function.

In the embodiment of the invention being described, the local line ILC is a "common" line that is, the communication channel provided by the line ILC is open for communication at all times to all of the extension telephones of the system. The local line ILS, on the other hand is a secret communication channel, with which a common secrecy guard circuit SGC is associated, the arrangement being such that once a connection over the local line ILS, between two or more of the extension stations of the system has been established, then no other station of the system can intrude upon that connection. The trunk lines TLA and TLB are each connected to respective external exchange lines over individual line circuits LCA and LCB, the latter being arranged so that only one extension station can have access to an exchange line at any time and so that a "hold" condition can be applied to an external exchange line, automatically, by the simple process of operating another of the push buttons at the extension telephone concerned, for example by operating the push button KL to set up a local inquiry or transfer connection or by operating the other of the KTA or KTB buttons to set up a second external line call over the other trunk line.

The secrecy guard circuit SGC and the exchange line circuits LCA and LCB each include test circuit elements, not shown in FIG. 1 which are connected in common to each of the extension stations over respective ones of the test leads LTS, LTTA and LTTB. Within each station, the leads LCS, TCA and TCB are connected, over respective ones of the control push buttons KLS, KTA and KTB, to the line coupling switch setting control circuit, the arrangement being such that the setting of the line coupling switch to a particular outlet is effected by operation of the appropriate push button, and is depending upon the free or busy condition of the associated test circuit element.

The condition of the local secret line ILS and of the trunk lines TLA and TLB is indicated at each extension station by the indicators LSE, LTA and LTB. Thus, the indicator LSE at each station is arranged to flash when the local secret channel is in use on a two party call and to glow steadily when this channel is in use by more than two extension stations, this enables the local secret channel to be used for conference type connections involving more than two extension stations, while at the same time assuring secrecy on two party calls. Similarly, the indicators LTA and LTB glow steadily when the respective trunk lines LTA and LTB are in use, and flash when the respective exchange line in on hold. To provide for the flashing signal indications a flash signal generator FSG is provided and is arranged for control from the secrecy guard circuit SGC and from the exchange line circuits LCA and LCB.

For incoming calls, a system of calling bells not shown in FIG. 1 is provided and located so that each extension station is within earshot of at least one bell, the arrangement being such that upon the occurrence of a call incoming over one or other of the exchange lines, the calling bells are caused to respond to the ringing signal from the external exchange while at the same time the respective indicator in each extension station is caused to blink in sympathy with the ringing signal interruptions, so that the incoming call may be answered by any extension station by removal of the station handset and operation of the appropriate control button KTA or KTB.

The keypad KP in each station is used to effect calling between stations of the system and also to effect the transmission of digital switch setting information to an external exchange for the setting up of an external call, thereat. To this end, as explained in more detail below, each push button of the keypad assembly actuates contacts in each of two electrically separate contact groups one or other of which is rendered effective depending upon the setting of the associated line coupling switch SW. Thus, for calling between stations of the system, that is, with the line coupling switch of the calling station in its first or second outlet position, the keypad contacts forming one group are effectively connected to respective ones of a group of calling signal leads CCL, which are commoned to respective contacts of the corresponding contact group of each extension station of the system. Also, within each station the calling buzzer BZ is connected to a respective one of these calling signal leads, as indicated by the strap ST1 for extension station 1, and by the strap ST10 for the extension station 10. Thus any extension station may call any other extension station by operating the keypad push button corresponding to the number of the wanted extension station and by lifting the station handset to listen for a verbal reply over the common channel ILC. For the establishment of external calls, the other group of keypad contacts is rendered effective upon the line coupling switch SW being set to a trunk line outlet 3 or 4. In the proposed arrangement, the contacts of this keypad contact group, in each extension station, are connected to an electronic digit signal sending element which may take the form of a dial pulse sending element of the kind which registers the digital value of each digit of the wanted external subscriber's directory number as it is keyed out from the keypad KP and then proceeds to send out over the trunk line concerned corresponding digital signals, for example as trains of impulses or as multi-frequency digital signal codes.

Now referring to FIGS. 2 and 3, FIG. 2 shows the circuitry which is repeated for each extension telephone station of the system, the outputs from each telephone station being indicated at the right-hand side of FIG. 2 and all these outputs of the several stations being connected in common. Outputs LC− and LC+ correspond to the lead ILC in FIG. 1, output LST corresponds to the line ILS of FIG. 1, outputs LS−, LS+ and LSP correspond to the line ILS of FIG. 1, outputs TA−, TA+ and TPA correspond to the line TLA in FIG. 1, output TTA corresponds to the line LTTA of FIG. 1, and outputs TB−, TB+ and TBA correspond to the line TLB of FIG. 1, while output TTB corresponds to the line LTTB of FIG. 1.

As is conventional each telephone station includes a telephone speech transmission circuit included within box TSC, and connected to the telephone handset. The telephone handset actuates a hook switch having normally open off-normal contact ON1. Relay contacts DON1 and DON2 provide for connection of an external exchange line either to leads TSC− and TSC+ of the speech transmission circuit TSC, or to a conventional dial pulse transmitting circuit including a relay contact DP1. Corresponding relays DON and DP are connected to a dial pulse sending circuit indicated within the box DPC, the operation of this circuit and the relays DON and DP being well known. The telephone keypad KP referred to above has two sets of operable contacts KA1 to KA0 and KB1 to KB0 as already described, these being connected as shown in FIG. 2 to provide alternative outputs either to the dial pulse circuit DPC or to a strapping field SF. Either one of the two groups of contacts may be rendered operative as already described above, by means of relay LT. When the LT relay is unoperated, a ground, via contact LT4 and the dial off-normal contact ON1 enables the keypad for selective calling of another telephone station by way of the strapping field and corresponding connected buzzer BZR.

FIG. 3 is divided by broken lines into separate circuit units corresponding to the units illustrated at the right hand side of FIG. 1, and the functions of the remaining components illustrated in FIGS. 2 and 3 have either been indicated above or will become apparent from the detailed description of the operation of the system now set out below.

1. Non-Secret Local Call

When any telephone station goes off-hook, starting from the idle condition shown in FIGS. 2 and 3 the leads TSC− and TSC+ of the telephone speech transmission circuit become connected to the lines LC− and LC+ of the common line circuit illustrated in FIG. 3, without the requirement for any push button operation to set the call. If the telephone station desires to make an internal call, the calling party operates his keypad to actuate the local buzzer at the wanted station and awaits a verbal answer. The keypad is rendered effective to actuate the buzzer by the relay contact LT4 which remains in the idle condition.

2. Secret Local Call

If parties to a call set up as described in paragraph 1 above wish their conversation to be confidential, or if a long conversation is involved and it is desired to free the common line circuit for use by other parties, each party presses their KLS button to transfer to the secrecy guard circuit indicated in FIG. 3. When the first KLS button is pressed; the battery potential from the corresponding extension telephone station is extended via lead LST to the secrecy guard circuit, the battery potential being applied via relay contact LP1 and the potential divider R11 and R12 to the base of transistor T5. Transistor T5 accordingly turns on and relay LC is energized. Relay contacts LC1 to LC4 accordingly change over from the position indicated in the drawing. Relay contact LC4 bypasses resistance R11, and this increases the current flowing in lead LST. As a result of the increased current through line LST, the relay TT of the telephone extension station is now operated, and the leads TSC− and TSC+ of the telephone speech transmission circuit TSC are accordingly extended via relay contacts TT1 and TT2 to the terminals LS+ and LS− of the secrecy guard circuit. By way of relay contact TT6, the relay TT is held energized over the lead LSP, via the forward biased emitter-base junction of transistor T1, and the now closed hook switch contact ON1.

The operation of relay LC initiates the operation of the secrecy indication signal facility, which was referred to in the introductory paragraphs. When relay LC operates in the manner described in the preceding paragraph, the associated contacts LC1 and LC2 change over from the position indicated in the drawing. Contact LC2 switches in emitter-base current for transistor T4 which turns on and provides emitter-base current for transistor T3 which accordingly turns on. SE relay now operates by way of the path: ground, transistor T3, the 590 winding of SE relay, LC1 contact, battery. A self hold path for relay SE is provided via contact SE1.

Upon depression of any further KLS contact while the initial contact remains depressed, the corresponding relay or relays TT are likewise energized so that the speech transmission circuits of the corresponding telephone stations are also connected to the terminals L− and L+ of the secrecy guard circuit. Upon release of the last KLS key, the battery potential is removed from the lead LST and thus the transistor T5 is turned off and relay LC becomes deenergized so that relay contacts LC1 to LC4 all returned to their idle conditions. The opening of relay contact LC1 is of no effect, since it has already been bridged by relay contact SE1 upon energization of relay SE as described in the above paragraph. Relay contact LC2 removes ground potential from the base of transistor T4, so that the caller is dependent on the potential on the LSP wire. The value of resistor R1 (FIG. 2) is such that when more than two relay windings TT are connected in parallel, the current flowing between the resistor and resistor R10 (FIG. 3) provides at the base of transistor T4 a potential sufficient to keep T4 turned on and to maintain the relay SE energized. If just two TT windings are connected in parallel, the current flowing in the LSP wire results in a potential which is insufficient to keep T4 turned on and the relay SE thus becomes deenergized.

When the LC relay releases as was described above, and the contact LC2 returns to its normal position, transistor T2 (FIG. 3) is turned on. The transistor T2 provides a bias current for transistor T6 which accordingly turns on and provides an operate path for relay LP. Relay LP operates, and relay contact LP1 changes over. The relay contact LP1 connects the circuit of a light-emitting diode LED1 (FIG. 2) via the LST lead, to the SE2 relay contact. Depending on the state of the SE relay as described above, the light-emitting diode circuit will be connected to battery via the relay contact LP1 (operated) and SE2 (operated), or to a flash generator circuit FG via LP1 (operated), SE2 (normal), the terminal FS and the flash generator circuit FG. If more than two extensions are connected to the secrecy guard circuit, the SE relay will be operated to battery via SE2 contact (operated) and the light-emitting diode LED1 will glow permanently, thus giving an indication to each extension that more than two extensions are involved in the call. If just two extensions are connected to the secrecy guard circuit, the SE relay will be released as has been described and the light-emitting diode LED1 will be connected to the intermittent battery of the flash generator FG via the SE2 contact (normal) causing the light-emitting diode LED1 to flash, thus indicating to the parties that only two extensions are involved in the call, and that a confidential call exists.

Upon termination of the call thus set up; when the last party hangs up, the off-normal contact ON1 in the extension instrument, releases and disconnects the main holding ground. Relay TT accordingly releases, and the local secret talk and conference channel becomes open circuited at relay contacts TT1 and TT2. Relays SE and LP also release at the cessation of the above mentioned holding ground, and disconnect the secrecy indication signaling facility.

3. Exchange Call

The system as described above has two exchange line circuits indicated at A and B in FIG. 1 and circuit A being illustrated in more detail in FIG. 3. Since both of these circuits are identical, however, only circuit A will be described in detail.

Relay P in the exchange line circuit is always operated when the said exchange line is in the idle and hold conditions. The operate path for the said relay is via transistor T7.

Assuming that an incoming call is received; the ringing current is received, via exchange wires EW1 and EW2 and relay contacts P1 and P2 (operated), by the rectifier bridge shown and thence is conducted to the winding of a ringing current detector relay RR. Energization of the said relay causes closure of the associated relay contact RR1 which closes the circuit of the warning bell system shown in box CB in dotted lines, and applied ground potential from terminal TPA to a switching circuit of the associated light-emitting diode LED2, at each extension, to illuminate the diode and give the identification of the exchange line from which the call is being transmitted. When a telephone extension goes off-hook the speech transmission circuit is, as described above, initially connected to terminals —LC and +LC of the common line circuit. However, to establish a connection with the desired external exchange line, one of the push buttons KTA or KTB is pressed, according to the exchange line to be connected.

Assuming that button KTA is pressed, relay LT is energized via the connection to ground through lead TTA and relay contacts LT1 to LT5 are thus transferred. The potential at the base of transistor T8 is sufficiently negative in order to forward bias the emitter-base of the said transistor and provide an operate path for relay PU so that relay PU becomes operated, and relay contacts PU1 and PU2 are thus transferred. Relay contacts LT1 and LT2 connect the speech transmission circuit TSC to terminals TA— and TA+ of the exchange line circuit via relay contacts TT3 and TT4. Relay contact LT4 holds relay LT energized, while relay contact LT3 extends ground potential via hook switch ON1 to the terminal TPA of the exchange line circuit A. (If button KTB were pressed, then both relays LT and TT would be energized to connect the speech transmission circuit TSC via contacts LT1, LT2 and TT3 and TT4 to terminals TB— and TB+ of the exchange line circuit B, the relays being held via contacts LT4, and LT3 and TT6 respectively, and ground potential being extended to lead TPB via contacts LT3 and TT5. The operation would otherwise be the same as described in connection with the exchange line circuit A). Ground potential at terminal TPA now causes the light-emitting diode LED2 to be steadily illuminated to indicate that the exchange line is busy. Relay contact PU1 closes a path to the base of transistor T7 so that both the base and emitter thereof are at ground potential and the transistor T7 turns off. Relay P therefore releases and its associated contacts revert to their normal positions. The above mentioned ringing current detector is switched out of circuit at contacts P1 and P2, and the exchange line is extended to the extension instrument, via terminals TA— and TA+. Relay contact P3 completes a holding current path for relay PU. When relay contact P4 restores to normal, transistors T9 and T10 turn on in well known manner and transistor T9 switches in an operate path for relay PP. Relay PP operates and holds via its own contact at PP3, prepares a holding loop at contact PP1 for the exchange line hold condition, to be described below, and prepares the flash generator circuit, at contact PP2, for connection to the light-emitting diode circuit.

4. Exchange Line Hold Condition

This is applied by removing the ground potential from lead TPA (or TPB), which occurs automatically upon an extension telephone setting another call without hanging up from the exchange call. For example, starting from the condition as described above, by pressing button KTB relay TT operates and at contact TT5 removes the ground potential from terminal TPA. Alternatively, by pressing button KL for transfer to the common line circuit, relay LT is deenergized and at relay contact LT3 removes the ground potential from the lead TPA. Removal of this ground potential from lead TPA allows the transistor T7 in the exchange line circuit A to turn on once more, thus switching in the operate path for relay P. Relay P re-operates and at the operated relay contacts P1 and P2, removes the exchange line from the extension. The line is held to the exchange via relay contact PP1 (operated) and a 200Ω hold resistor R21.

When relay P re-operates as described in the above paragraph, the holding battery for maintaining an operate path for relay PU via transistor T8 is removed at the contact P3, and relay PU is released. The intermittent battery from the flash generator FG is thus extended to the light-emitting diode LED2 via, terminal FE, relay contact PP2 (operated) and relay contact PU1 (released) all these being in the exchange line circuit, the TPA wire and the light-emitting diode circuit. The light-emitting diode will flash in accordance with the intermittent battery thus giving the "line held" indication.

Any telephone extension may now connect to the exchange line A, by operation of the corresponding push button switch KTA, but the flashing signal from the light-emitting diode LED2 will deter a party from making such a connection unless that party has received a message indicating that this connection is desired by the party calling on the exchange line.

5. Release of Exchange Line

When a telephone extension connected to an exchange line clears down, the contacts ON1 of the hook switch operated by the telephone handset are opened, thus removing the ground potential from the relay LT. However, ground potential is initially maintained at lead TPA (or TPB), so that relay LT remains energized by current flowing to lead TPA. This current flow causes transistor T11 to be turned on and relay RE to be energized, whereby relay contacts RE1 and RE2 change over. Relay contact RE2 thus extends battery potential to the base of transistor T10, thus causing the transistors T10 and T9 to turn off and cause the release of relay PP. Contact PP2 in releasing, disconnects the flash generator from the exchange line circuit. Relay contact RE1 also disconnects the final holding ground for relay LT. LT relay, accordingly releases, and at contacts LT1 and LT2 disconnects the extension from the exchange line circuit.

The removal of ground from the off-normal contacts ON1 as described above, allows transistors T4 and T3 to turn on once more. Relay P therefore re-operates and releases the exchange line from the exchange line circuit at contacts P1 and P2, and releases the PU relay at contact P3. Relay PU in operating finally releases the relay RE at relay contact PU2.

When the exchange line is in the line-held condition, the said line cannot release itself in the manner described above. The button KTA (or KTB) must be depressed so that the exchange line in question can be seized once more; release will then follow as described above upon hanging up of the connected extension.

What I claim is:

1. A telephone intercommunication system including a plurality of telephone stations, a common communication circuit accessible to each of said telephone stations via line coupling switch means individual to each station, and a common control means for operating the line coupling switch means of each station to establish a connection to said common communication circuit in response to actuation of a corresponding manually operable control means of that station, the arrangement being such that when, following establishment of an initial connection to said common communication circuit via said line coupling switch means, the condition occurs that all of said manually operable control means are inoperative, said common control means is rendered ineffective to establish any further connection to the common communication circuit until the existing connections are released; said system further including means for detecting whether the number of connections established to said common communication circuit exceeds two when said condition occurs, and means for providing a corresponding warning signal at each telephone station.

2. The system as claimed in claim 1, in which each said line coupling switch means comprises a self-holding relay having relay contacts for establishing the connection to said common communication circuit, the corresponding manually operable means each comprising a push button switch arranged in a current path including the winding of said relay and extending to said common control circuit, and said common control circuit further including in said current path a relay having relay contact arranged to modify a control signal applied via said current path, the arrangement being such that actuation of said push button switch first causes energization of the relay of the common control circuit and then, by means of said modified control signal, energization of said line coupling relay connected via a corresponding push button switch, release of all push button switches serving to deenergize the relay of the common control circuit, and means, responsive to closure of said communication circuit, being provided for inhibiting reenergization of the common control relay until the common communication circuit is broken.

3. The system as claimed in claim 2, in which the means for inhibiting energization of the common control relay comprises a relay having a winding arranged in series in said common communication circuit and a normally closed relay contact in the current path to the winding of said common control relay, the latter relay having normally closed contacts in said common communication circuit.

4. A system as claimed in claim 2, in which each of said self-holding relays have hold contacts connected in parallel to a common current path for energization of said relays, the arrangement being such that relay windings connected in parallel by way of said hold contacts form part of a potential divider circuit, and that when more than two of said relay windings are connected in parallel the potential at a tapping of said divider circuit causes a switching circuit connected thereto to respond and provide said warning signal.

* * * * *